US006207775B1

United States Patent
Martí et al.

(10) Patent No.: US 6,207,775 B1
(45) Date of Patent: Mar. 27, 2001

(54) HOMOGENEOUS FILLED POLYMER COMPOSITE

(75) Inventors: Miguel García Martí, Blankenberge; Michael Alexandre, Angleur; Philippe G. Dubois, Ciplet; Robert J. E. G. Jérôme, Sart-Jalhay; François J. Hindryckx, Méry, all of (BE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/141,200

(22) Filed: Aug. 27, 1998

Related U.S. Application Data

(60) Provisional application No. 60/057,396, filed on Aug. 29, 1997.

(51) Int. Cl.$^7$ .............................. C08F 4/44; B01J 31/00; C08I 4/06
(52) U.S. Cl. ................ 526/160; 526/133; 526/154; 502/120; 525/268; 523/344
(58) Field of Search ................ 526/160, 348.3, 526/133, 154; 523/344; 502/120; 525/97, 268

(56) References Cited

U.S. PATENT DOCUMENTS

| | | | |
|---|---|---|---|
| 3,503,785 | 3/1970 | Kruse | 117/62.2 |
| 3,578,629 | 5/1971 | McManimie | 260/41 |
| 4,097,447 | 6/1978 | Howard, Jr. | 260/42.14 |
| 4,187,210 | * 2/1980 | Howard, Jr. et al. | 260/42.14 |
| 4,473,672 | 9/1984 | Bottrill | 523/215 |
| 4,526,943 | 7/1985 | Fuentes, Jr. et al. | 526/133 |
| 4,564,647 | * 1/1986 | Hayashi et al. | 523/211 |
| 4,752,597 | * 6/1988 | Turner | 502/104 |
| 4,950,631 | * 8/1990 | Buehler et al. | 502/119 |
| 5,098,969 | * 3/1992 | Buehler et al. | 526/119 |
| 5,359,001 | * 10/1994 | Epple et al. | 525/97 |
| 5,412,001 | * 5/1995 | Fries | 523/344 |
| 5,422,386 | * 6/1995 | Fries et al. | 523/344 |
| 5,475,075 | * 12/1995 | Brant et al. | 526/348.3 |
| 5,648,310 | * 7/1997 | Wasserman et al. | 502/120 |
| 5,763,547 | 6/1998 | Kolthammer et al. | 526/129 |
| 5,834,393 | 11/1998 | Jacobsen et al. | 502/152 |
| 5,840,808 | * 11/1998 | Sugimura et al. | 525/268 |

FOREIGN PATENT DOCUMENTS

| | | | |
|---|---|---|---|
| 0 063 459 A1 | 10/1982 | (EP) | C08F/10/00 |
| 0 142 143 B1 | 5/1985 | (EP) | C08F/10/02 |
| 0 374 619 A1 | 6/1990 | (EP) | C08F/10/02 |
| 93/03072 | 2/1993 | (WO) | C08F/10/02 |
| 96/34900 | 11/1996 | (WO) | C08F/10/00 |
| 97/07887 | 3/1997 | (WO) | C08F/4/44 |

OTHER PUBLICATIONS

Macromolecular Rapid Communications, vol. 17, #1, pp. 1–71, Jan. 1996.*
Polymer Preprints, vol. 37, #2, p.474, Aug. 1996.*
K. Peng, S. Xiao; "Studies on methylaluminoxane and ethylene polymerization"; Journal of Molecular Catalysis 90, (1994), pp. 201–211.
C. Janiak, B. Rieger; "Silica gel supported zirconocene dichloride/methylalumoxane catalysts for ethylene polymerization: Effects of heterogenation on activity, polymer microstructure and product morphology"; Die Angewandte Makromolekulare Chemie 215, (Nr. 3746), (1994), pp. 47–57.
K. Soga, M. Kaminaka; Copolymerization of olefins with $SiO_2$–, $Al_2O_3$–, and $MgCl_2$–supported metallocene catalysts activated by trialkylaluminiums; Macromol. Chem. Phys. 195, (1994), pp. 1369–1379.
E.G. Howard, et al.; Homogeneous Composites of Ultrahigh Molecular Weight Polyethylene and Minerals. 1. Synthesis[1]; Ind. Eng. Chem. Prod. Res. Dev. 1981, 20, pp. 421–428.
E.G. Howard, et al.; Homogeneous Composites of Ultrahigh Molecular Weight Polyethylene and Minerals. 2. Properties[1]; Ind. Eng. Chem. Prod. Res. Dev. 1981, 20, pp. 429–433.
W. Kaminsky, H. Zielonka; "Polymerization of Olefins in the Presence of Metal Powders with Homogeneous Catalysts"; Polymers for Advanced Technologies, vol. 4, pp. 415–422, 1981.
M. Alexandre et al; Centre for Education and Research on Macromolecules (CERM) / R&D of Dow Benelux N.V.; Synthesis and characterization of polymerization–filled composites (PFC) based on various fillers and polyethylene matrices; Oral Presentation at Interfacial Phenomena in Composite Materials (IPCM '97); Sep. 1–3, 1997.
P. Dubois et al; Centre for Education and Research on Macromolecules (CERM) / R&D of Dow Benelux N.V.; Polymerization–filled composites by supported metallocene based catalysts; Oral Presentation at Eurofillers 97 (Manchester (UK); Sep. 8–11, 1997.

* cited by examiner

*Primary Examiner*—Fred Zitomer
*Assistant Examiner*—Tanya Zalukaeva

(57) ABSTRACT

The present invention relates to a process for preparing a filled polymer composite comprising from 1 to 98 percent by weight of an interpolymer and from 2 to 99 percent by weight of a filler, said process comprising copolymerization in the presence of a cyclopentadienyl-containing transition metal catalyst and a filler, said filler having immobilized thereon a suitable cocatalyst.

11 Claims, No Drawings

HOMOGENEOUS FILLED POLYMER COMPOSITE

CROSS REFERENCE TO RELATED APPLICATIONS

This application claims the benefit of U.S. Provisional Application No. 60/057,396, filed Aug. 29, 1997.

FIELD OF THE INVENTION

The present invention relates to a process for preparing a filled polymer composite comprising from about 1 to about 98 percent by weight of interpolymer and from about 2 to 99 percent by weight of filler, the composite obtainable by said process and a shaped article made from such composite.

BACKGROUND OF THE INVENTION

Fillers have been incorporated into interpolymers by melt blending. The preparation of composites by melt blending the polymeric matrix and the filler is a straightforward procedure, but poorly efficient with respect to the properties of the resulting composite. In order to overcome these deficiencies, techniques have been proposed which are based on either the encapsulation of the filler by a polymer coating or the chemical modification of the filler surface. In addition, a polymerization-filling technique has been developed which involves attachment of a Ziegler-Natta-type catalyst onto the surface of an inorganic filler and polymerization of the olefin from the filler surface, (see for example, E. G. Howard et al., Ind. Eng. Chem. Prod. Res. Dev. 20, 421–429 (1981)).

Using this technique, synthesis of polyethylene-based composites by a Al/Ti/Mg catalyst anchored on the surface of kaolin has been reported (International Patent Application WO 96/34900; F. Hindryckx et al., J. Appl. Polym. Sci. 64, 423–438, 439–454 (1997)).

Furthermore, preparation of polymerization-filled composites using a metallocene catalyst has been reported. Kaminsky et al., in German Patent Application DE 3240382, describe the preparation of composites containing polyethylene, or an ethylene butene copolymer, and an inorganic filler using a bis(cyclopentadienyl) zirconocene. Yet, the molar ratios of cocatalyst to catalyst species used in DE 3240382 are very high, ranging from about 32000 to 312500. Synthesis of aluminum- or zinc-containing polyethylene or polypropylene composites has been promoted by a bis(cyclopentadienyl) zirconocene adsorbed on the metal surface (Kaminsky and Zielonka, Polym. Adv. Technol. 4, 415–422 (1993)). Hayashi et al., European Patent Application EP-A-0 374 619, describe polymerization of ethylene in the presence of an organo-aluminum compound and a product obtained by contact treatment of a bis(cyclopentadienyl) zirconocene or a bis(cyclopentadienyl) titanocene catalyst with a filler.

Presently available methods for the preparation of filled composites suffer from various disadvantages. For example, if polymerization does not take place at the filler surface but rather in the homogeneous phase, such as a diluent or solvent, heterogeneous composites are obtained. On the other hand, known methods using polymerization-filling have employed excessive molar ratios of cocatalyst relative to the catalyst species in order to improve polymerization rate and efficiency. A process achieving efficient copolymerization of ethylene or propylene in the presence of a filler with a higher alpha-olefin has not been described yet.

Accordingly, there is a need for an improved process for the preparation of a filled polymer composite, said process eliminating or reducing the disadvantages associated with the known methods and providing a composite with advantageous physico-mechanical properties.

It is the object of the present invention to provide such process.

SUMMARY OF THE INVENTION

The present invention relates to a process for the preparation of a filled polymer composite comprising about 1 to about 98 percent by weight of an interpolymer, and about 2 to about 99 percent by weight of a filler. The process comprises polymerizing ethylene or propylene, and at least one comonomer, in the presence of a cyclopentadienyl-containing transition metal catalyst and a filler, said filler having immobilized thereon a cocatalyst for the cyclopentadienyl-containing transition metal catalyst, under conditions to allow copolymerization of ethylene or propylene and at least one comonomer to form said composite.

In a further aspect, the invention provides a filled composite comprising an ethylene-based or propylene-based interpolymer and a filler, which composite is obtainable by the process of the invention.

In yet another aspect, the invention relates to a shaped article made from such filled polymer composite.

DETAILED DESCRIPTION OF THE INVENTION

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups. Included within the term "hydrocarbyl" as used herein are $C_{1-50}$ straight, branched and cyclic alkyl radicals, $C_{6-50}$ aromatic radicals, $C_{7-50}$ alkyl-substituted aromatic radicals, and $C_{7-50}$ aryl-substituted alkyl radicals. The term hydrocarbyloxy means a hydrocarbyl group having an oxygen link between it and the element to which it is attached.

The filler composition used in the present process contains active polymerization sites on the filler. The active polymerization sites are generated on the filler by immobilizing a suitable cocatalyst to the filler and contacting the cocatalyst-carrying filler with a cyclopentadienyl-containing transition metal catalyst. The term "cyclopentadienyl-containing transition metal catalyst or compound" as used herein means a transition metal compound containing at least one cyclopentadienyl or cyclopentadienyl-derivative ligand. These transition metal compounds are sometimes also referred to as metallocenes. Preferably, such a catalyst having a constrained geometry is used.

The polymerization sites are active in that they are capable of efficiently promoting or catalyzing copolymerization of ethylene or propylene with at least one other monomer on the filler. Substantially all active polymerization sites are associated with the filler under conditions used in the process of the present invention. Thus, a diluent used in the polymerization step is substantially free from active catalyst. The components employed in the process of the present invention are used in a form which allows the reactions to take place at the surface of the filler.

The process of the present invention provides homogeneous-filled composites displaying advantageous properties, such as, for example, good interfacial adhesion between (catalyst treated) filler material and interpolymer matrix, homogeneous dispersion of filler within the polymer matrix, and control of the molecular weight of the interpolymer over a wide range, together with a high level of comonomer incorporation. The composite obtainable according to the process of the present invention can be specifically designed to have desired and advantageous properties, particularly advantageous mechanical properties.

The process according to the invention requires the polymerization being carried out in the presence of a filler having cocatalyst immobilized thereon, and further the transition metal compound. In a preferred aspect, the process involves immobilizing the cocatalyst to the surface of the filler particles, adding of the metallocene catalyst and copolymerizing ethylene or propylene with at least one other olefin. Interpolymerization and composite formation occur simultaneously. As the diluent or solvent around the filler is substantially free from cocatalyst, the interpolymer is formed from the filler surface and not in the solvent or diluent. An interpolymer coating, preferably based on an interpolymer of low or ultra low density, that is, having a relatively high amount of comonomer incorporated therein, is produced at the filler surface, resulting in a homogeneous composite wherein the filler is uniformly dispersed in the interpolymer matrix. The maximum amount of filler which is uniformly dispersible in the interpolymer matrix depends, inter alia, on the particular filler used. If only spots of polymer are produced on the filler particles, the amount of filler is too high.

In a further aspect, the invention provides a filled composite comprising an ethylene-based or propylene-based interpolymer and a filler, which composite is obtainable by the process of the invention. Such composite may be useful in various ways, for example, for producing articles of manufacture, including shaped articles, such as wire and cable coverings, parts for electrical applications with magnetic, semi-conductive, piezo-electric properties, or films with improved additive dispersions.

Furthermore, the invention relates to a shaped article made from such composite.

The filler component is a solid material, which differs from the interpolymer matrix in composition and structure. The filler must have a melting point which is above the melting point of the interpolymer. For the purpose of the present invention, the nature of the filler material is not particularly critical, but the filler may be chosen in accordance with the standards set on the filled composite. For example, the filler may serve to attain selected physico-mechanical or electrical properties, such as impact strength, thus acting as reinforcing material, fire retardancy, ignition resistance, conductance properties, or to reduce costs. Various fillers can be used, provided that the cocatalyst can be immobilized on the surface and that these are insoluble in the solvents employed in the process. The filler material may be organic or preferably inorganic, having a neutral, acid or basic surface.

Particle shape and size of the filler are variables that can be selected depending on the desired properties of the composite. For example, the filler may be particulate, plate-like or fibrous. Typically, the fillers used in accordance with this invention have an average particle size of less than about 50 $\mu$m, especially of from about 0.1 $\mu$m to less than about 50 $\mu$m. If the average particle size is smaller than about 0.1 $\mu$m or larger than 50 $\mu$m, the physico-mechanical properties, such as impact strength and elongation, may not be as advantageous as desired, particularly for composites having high filler levels. Particle size may be determined by conventional methods, such as sieve analysis. Particularly preferred is a filler having a particle size in the range of from about 0.1 $\mu$m to about 5 $\mu$m.

The filler material preferably has a surface area, as determined by BET analysis, which is higher than about 0.1 m$^2$/g, more preferably higher than about 0.5 m$^2$/g and most preferably higher than about 5 m$^2$/g. The surface area of the filler is preferably less than about 100 m$^2$/g, more preferably less than about 50 m$^2$/g, and most preferably less than about 20 m$^2$/g.

The filler material utilized in the present invention is such that the cocatalyst can be immobilized to the filler surface. Immobilization of the cocatalyst means that after treatment of the filler with the cocatalyst, the cocatalyst remains attached onto the filler surface and substantially does not leach off from the filler under polymerization conditions. Thus, substantially no soluble active catalyst species is present in the polymerization mixture, but the immobilization of the cocatalyst on the filler results in substantially all active polymerization sites being attached to the filler. This can be tested, for example, by subjecting the liquid phase which has been surrounding the filler carrying active polymerization sites, or an aliquot thereof, in the presence of (co)polymerizable olefins to suitable polymerization conditions. If substantially all active polymerization sites are attached to the filler and thus substantially none remain in the liquid phase, no significant polymerization takes place.

Advantageously, the filler material has surface functionality. Surface functionality refers to accessible functional groups, particularly hydroxyl groups, located on the surface of the filler particles including pores and caves. The amount of functional groups at the filler surface can be quantitatively determined, for instance by assessing the number of hydroxyl groups per g of filler. If desired, the number of accessible hydroxyl groups may be reduced, for example, by dehydroxylating the filler. For example, the surface hydroxyl content per g of filler may vary from about 0.001 mmol, preferably 0.01 mmol, to about 10 mmol, preferably about 5 mmol, of hydroxyl groups.

Prior to treatment with the cocatalyst, if desired, the filler material may be subjected to a treatment suitable to reduce the water content or the hydroxyl content of the filler material, in particular heat treatment and/or chemical treatment. Typically, thermal pretreatments are carried out at a temperature from 30° C. to 1000° C. for a duration of 10 minutes to 50 hours in an inert atmosphere or under reduced pressure.

Representative examples of suitable fillers include, for example, metals and their salts, particularly metal oxides, metal hydroxides, metal sulfates and metal carbonates, carbonaceous substances, ceramics, glass and organic pigments. Useful metal oxides are, for example, alumina, titania, such as rutile and anatase, zirconia, silica, such as sand, diatomaceous earth and pumice, iron oxide, as well as silica-alumina, mica and ferrite. Metal hydroxides include magnesium and aluminum hydroxides. Exemplary metal carbonates are calcium carbonate, zinc carbonate and barium carbonate. The carbonaceous substances include carbon black, graphite, active carbon and carbon fibers.

Preferred filler materials are aluminum silicate clays of the general formula Al$_2$O$_3$.xSiO$_2$.nH$_2$O, wherein x is from 1 to 5 and n is from 0 to 4. Suitable aluminum silicate clays of this formula include kaolinite, attapulgite, fuller's earth and bentonite. These clays typically have an average particle size of from about 0.1 $\mu$m to 44 about $\mu$m. A particularly preferred clay is kaolinite. Commercially available kaolinite clays include, for example, Hydrite™ MP (calcinated), having an average particle size of 9.5 μm; ASP 400 (calcinated), with an average particle size of 4.8 μm; ASP 100 (calcinated), with an average particle size of 0.55 μm; Satintone™ W/W (calcinated), with an average particle size of 1.4 μm; Satintone™ 5 (calcinated), with an average particle size of 0.8 μm; and Satintone™ plus (calcinated), with an average particle size of 2 μm.

Homogeneous dispersion of the filler in the composite can be improved by reducing or eliminating aggregation or agglomeration of filler particles. Filler particles may aggregate or agglomerate because of physical or chemical interactions between the different particles. Advantageously, filler aggregates are deagglomerated prior to addition of the cocatalyst. Deagglomeration of mineral particles may be accomplished, for example, by drying the filler material and/or treating it with an organophilic reagent, such as an organoaluminum compound. Such treatment is thought to make the filler more hydrophobic and accordingly prevent the particles from (re-)agglomerating and improve dispersion of the filler in the diluent.

More specifically, a filler with surface hydroxyl groups, such as kaolin, is treated with an organoaluminum compound in a suitable diluent in order to improve dispersion of the filler in the diluent, before adding the cocatalyst. The deagglomeration or dispersing effect of the organoaluminum compound may be tested by sedimentation experiments, for example, by comparing sedimentation times of filler treated with various amounts of organoaluminum compound with untreated filler. For the same filler material, increase in settling time indicates improved dispersion or deagglomeration of the filler.

Suitable organoaluminum compounds include hydrocarbyl aluminum compounds, such as trihydrocarbylaluminum, dihydrocarbyl aluminum hydride, hydrocarbyloxide, and halide, particularly trialkyl aluminum, dialkyl aluminum hydride, dialkyl aluminum alkoxide, and dialkyl aluminum monohalide, wherein the alkyl groups independently contain from 1 to 10 carbon atoms. Preferred are trialkyl aluminum compounds containing 1 to 4 carbon atoms, such as triisobutyl aluminum and triethyl aluminum.

"Cocatalyst" as used herein particularly refers to a compound which when combined with the cyclopentadienyl-containing transition metal compound provides a catalyst capable of catalyzing the interpolymerization of the monomers used in the present process. In the polymerization process of the present invention, the cocatalyst is used in an immobilized form, that is, substantially all of the cocatalyst is immobilized to the surface of the filler. Suitable cocatalysts are commercially available or can readily be prepared according to methods generally known in the art.

Highly preferred cocatalysts are alumoxanes. An alumoxane (also referred to as aluminoxane) is an oligomeric or polymeric aluminum oxy compound containing chains of alternating aluminum and oxygen atoms, whereby the aluminum carries a substituent, preferably an alkyl group. The exact structure of alumoxane is not known, but is generally believed to be represented by the following general formulae (—Al(R)—O)$_m$, for a cyclic alumoxane, and R$_2$Al—O(—Al(R)—O)$_m$—AlR$_2$, for a linear compound, wherein R independently in each occurrence is a $C_1$–$C_{10}$ hydrocarbyl, preferably alkyl, or halide and m is an integer ranging from 1 to about 50, preferably at least about 4. Alumoxanes are typically the reaction products of water and an aluminum alkyl, which in addition to an alkyl group may contain halide or alkoxide groups. Reacting several different aluminum alkyl compounds, such as, for example, trimethylaluminum and triisobutyl aluminum, with water yields so-called modified or mixed alumoxanes.

Preferably, the aluminoxane is of the formula $(R^4_x(CH_3)_yAlO)_n$, wherein $R^4$ is a linear, branched or cyclic $C_1$–$C_6$ hydrocarbyl, x is from 0 to about 1, y is from about 1 to 0 and x+y=1, and n is an integer from 3 to 25, inclusive. The preferred aluminoxane components, referred to as modified methylaluminoxanes, are those wherein $R^4$ is a linear, branched or cyclic $C_3$–$C_9$ hydrocarbyl, x is from about 0.15 to about 0.50, y is from about 0.85 to about 0.5 and n is an integer between 4 and 20, inclusive. Still more preferably, $R^4$ is isobutyl, tertiary butyl or n-octyl; x is from about 0.2 to about 0.4; y is from about 0.8 to about 0.6 and n is an integer between 4 and 15, inclusive. Mixtures of the above aluminoxanes may also be employed in the practice of the present invention.

More preferably, the aluminoxane is of the formula $(R^4_x(CH_3)_yAlO)_n$, wherein $R^4$ is isobutyl or tertiary butyl; x is about 0.25; y is about 0.75 and n is an integer from about 6 to about 8.

Particularly preferably, the cocatalyst is a methyl aluminoxane (MAO), or a modified methyl aluminoxane (MMAO), which is completely soluble in alkane solvents, for example, heptane, and includes very little, if any, trialkylaluminum. A technique for preparing such modified aluminoxanes is disclosed in U.S. Pat. Nos. 5,041,584 and 5,648,310 (columns 7 to 8). Aluminoxanes for the purpose of the present invention may also be made as disclosed in U.S. Pat. Nos. 4,542,199; 4,544,762; 5,015,749; and 5,041,585.

Aluminoxanes can also be prepared in situ by using surface hydroxyl groups, optionally in the presence of stoichiometric amounts of water of the filler, and by dropwise addition of a cocatalyst precursor, such as trialkyl aluminum or mixtures thereof, particularly trimethyl aluminum (TMA), triethyl aluminum (TEA), or triisobutyl aluminum (TIBA), or a mixture thereof. In situ formation of MAO is described, for example, by Peng K., Xiao S., Journal of Molecular Catalysis 90, 201–211 (1994).

The aluminoxane may be readily immobilized onto the filler in an inert solvent, under an inert atmosphere, preferably argon or nitrogen, and under anhydrous conditions. Suitable inert solvents include aliphatic or aromatic organic solvents.

A preferred cocatalyst-treated filler component of the present invention comprises a filler material and an alumoxane immobilized thereto, in which the aluminum present in the cocatalyst component, in general, is not more than about 10 percent by weight, extractable in a one-hour extraction with toluene at a temperature of 90° C., using about 10 mL toluene per gram of treated filler component. Preferably, not more than about 9 percent aluminum present in the cocatalyst-treated filler component is extractable, and most preferably not more than about 8 percent.

The toluene extraction test may be carried out as follows. About 1 g of aluminoxane-treated filler, with a known aluminum content, is added to 10 mL toluene and the mixture is then heated to 90° C. under an inert atmosphere. The suspension is stirred well at this temperature for 1 hour. Then, the suspension is filtered applying reduced pressure to assist in the filtration step. The solids are washed twice with about 3 to 5 mL toluene per gram of solids at 90° C. The solids are then dried at 120° C. for 1 hour, and subsequently the aluminum content of the solids is measured. The difference between the initial aluminum content and the aluminum content after the extraction divided by the initial aluminum content and multiplied by 100 percent, gives the amount of extractable aluminum.

The aluminum content may be determined by slurrying about 0.5 g of treated filler in 10 mL hexane. The slurry is treated with 10 to 15 mL 6N sulfuric acid, followed by addition of a known excess of EDTA. The excess amount of EDTA is then back-titrated with zinc chloride.

After treatment of the filler with cocatalyst, the cocatalyst-carrying filler should be washed in order to remove excess cocatalyst or cocatalyst precursor which is not immobilized at the filler surface, including inside the pores at the surface of the particles. Advantageously, the washing step is performed employing a hydrocarbon solvent in which free, that is, non-immobilized cocatalyst or its precursor is soluble. The solvent used for washing may be the same or different from the solvent used to contact the filler and the cocatalyst. For example, heptane may be used to contact the filler and the cocatalyst and toluene may be used in the subsequent washing step.

In a preferred embodiment the cocatalyst is immobilized on the filler by a heating step. Before subjecting the treated filler to the heating step, the diluent or solvent is removed to obtain a free-flowing powder. This is preferably done by applying heat, reduced pressure, evaporation, or combinations of such techniques.

The heat treatment is preferably carried out at a temperature of at least 50° C., preferably at least 100° C., up to 250° C., most preferably at about 150° C. for a period from 15 minutes to 72 hours, preferably up to 24 hours, most preferably for about 2 hours. The heat treatment is carried out at reduced pressure or under an inert atmosphere, such as nitrogen gas, but preferably at reduced pressure.

After the heating step one or more wash steps can be carried out to remove any non-immobilized cocatalyst. The washing conditions should be such that non-immobilized cocatalyst is soluble in the wash solvent. The treated filler is preferably subjected to one to five wash steps using an aromatic hydrocarbon solvent at a temperature from 0° C. to 110° C. More preferably, the temperature is from 20° C. to 100° C. Preferred examples of aromatic solvents include toluene, benzene and xylenes. More preferably, the aromatic hydrocarbon solvent is toluene. The number of washing steps is chosen such that the final wash is substantially free from detectable amounts of cocatalyst. Typically, 1 to 5 washing steps will be sufficient. No washing step is necessary, if the added cocatalyst is quantitatively immobilizable on the filler particles at the temperature chosen for polymerization.

The quantity of cocatalyst compound immobilized at the filler surface can be assessed using conventional methods known to those skilled in the art. For example, the amount of immobilized cocatalyst is assessable indirectly by titrating the amount of cocatalyst in the wash or directly by chemical analysis on a sample of treated filler. The amount of immobilized cocatalyst should be determined in order to calculate the molar ratio of cocatalyst to catalyst species employed in the process of the invention. For alumoxane cocatalysts, this ratio is expressed in moles of aluminum in the alumoxane per moles of transition metal in the catalyst.

Suitable cyclopentadienyl-containing transition metal compounds for use in the present invention contain at least one π-bonded cyclopentadienyl ligand or a π-bonded cyclopentadienyl derivative ligand. Examples of such ligands include cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

By the term "π-bonded" is meant that the ligand group is bonded to the transition metal by means of delocalized π electrons thereof.

A suitable class of transition metal compounds useful in the present invention corresponds to the Formula (I):

or a dimer of Formula (I), wherein:

L is π-bonded cyclopentadienyl or cyclopentadienyl derivative group that is bonded to M, containing up to 50 non-hydrogen atoms; optionally, two L groups may be joined together forming a bridged-structure, and also optionally, one L may be bonded to X;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral ligand base having up to 20 non-hydrogen atoms;

X" in each occurrence is a monovalent, anionic moiety having up to 40 non-hydrogen atoms, optionally, two X" groups may be covalently bonded together forming a divalent dianionic moiety having both valences bonded to M, or, optionally two X" groups may be covalently bonded together to form a neutral, conjugated or nonconjugated diene that is π-bonded to M, or further optionally one or more X" and one or more X' groups may be bonded together thereby forming a moiety that is both covalently bound to M and coordinated thereto by means of Lewis base functionality;

l is 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M.

Complexes containing two L groups include those containing a bridging group linking the two L groups. Preferred bridging groups are those corresponding to the formula $(ER*_2)_x$ wherein E is silicon, germanium, tin, or carbon, R* independently each occurrence is hydrogen or a group selected from silyl, hydrocarbyl, hydrocarbyloxy, and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two L groups are compounds corresponding to the Formulae (II) and (III):

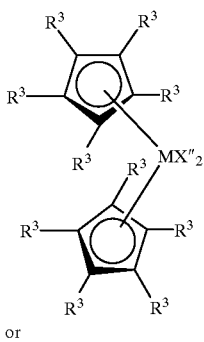

(II)

or

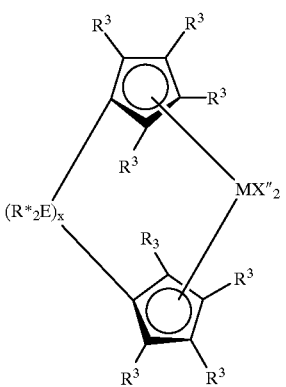

(III)

wherein:
M is titanium, zirconium or hafnium, preferably zirconium or hafnium, in the +2 or +4 formal oxidation state;
$R^3$ in each occurrence independently is selected from hydrogen, hydrocarbyl, silyl, germyl, cyano, halo or combinations thereof, said $R^3$ having up to 20 non-hydrogen atoms, or adjacent $R^3$ groups together form a divalent derivative (that is, a hydrocarbodiyl, siladiyl or germadiyl group) thereby forming a fused ring system, and
X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, and
R*, E and x are as previously defined for bridging groups $(ER*_2)_x$.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980).

Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups in Formulae (II) and (III) are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

A further class of metal complexes utilized in the present invention corresponds to the preceding formula (I) $L_lMX_mX'_nX''_p$, or a dimer thereof, wherein X is a divalent substituent of up to 50 non-hydrogen atoms that together with L forms a metallocycle with M.

Preferred divalent X substituents include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from nitrogen, phosphorus, oxygen or sulfur that is covalently bonded to M.

A preferred class of such Group 4 metal coordination complexes used according to the present invention corresponds to the Formula (IV):

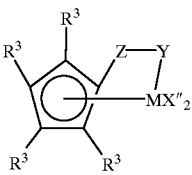

(IV)

wherein:
M is titanium or zirconium, preferably titanium in the +2, +3, or +4 formal oxidation state;
$R^3$ in each occurrence independently is selected from hydrogen, hydrocarbyl, silyl, germyl, cyano, halo, hydrocarbyloxy, dihydrocarbylamino, or combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system,
each X" in Formula (IV) is a hydride, halide, hydrocarbyl, hydrocarbyloxy or silyl group, said group having up to 20 non-hydrogen atoms, or two X" groups together form a neutral $C_{5-30}$ conjugated diene or a divalent derivative thereof;
Y is —O—, —S—, —NR*—, —PR*—, —NR*$_2$ or —PR*$_2$; and
Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is as previously defined.

Suitable bridged monocyclopentadienyl or mono(substituted cyclopentadienyl) transition metal compounds include the so-called constrained geometry complexes. Examples of such complexes and methods for their preparation are disclosed in U.S. patent application Ser. No. 545,403, filed Jul. 3, 1990 (corresponding to EP-A-416,815), U.S. patent application Ser. No. 241,523, filed May 12, 1994 (corresponding to WO-95/00526), as well as U.S. Pat. Nos. 5,055,438; 5,057,475; 5,096,867; 5,064,802; 5,132,380; and 5,374,696, all of which are incorporated herein by reference.

More preferred transition metal +2 compounds according to the present invention correspond to the Formula (V):

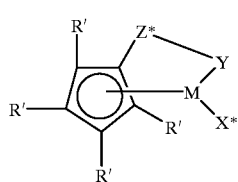

(V)

wherein:
R' in each occurrence is independently selected from hydrogen, hydrocarbyl, silyl, germyl, halo, cyano, or combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X* is a neutral $\eta^4$-bonded diene group having up to 30 nonhydrogen atoms, which forms a π-complex with M;

Y is —O—, —S—, —NR*—, —PR*—;

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$; wherein:

R* in each occurrence is independently hydrogen, or a member selected from hydrocarbyl, silyl, halogenated alkyl, halogenated aryl, or combinations thereof, said R* having up to 10 nonhydrogen atoms, and optionally, two R* groups from Z* (when R* is not hydrogen), or an R* group from Z* and an R* group from Y form a ring system.

Preferably, R' independently in each occurrence is hydrogen, hydrocarbyl, silyl, halo or combinations thereof said R' having up to 10 nonhydrogen atoms, or two R' groups (when R' is not hydrogen or halo) together form a divalent derivative thereof; most preferably, R' is hydrogen, methyl, ethyl, propyl, butyl, pentyl, hexyl, (including where appropriate all isomers), cyclopentyl, cyclohexyl, norbornyl, benzyl, or phenyl or two R' groups (except hydrogen) are linked together, the entire C$_5$R'$_4$ group thereby being, for example, an indenyl, tetrahydroindenyl, fluorenyl, tetrahydrofluorenyl, or octahydrofluorenyl group.

More preferably, at least one of R' or R* is an electron donating moiety. By the term "electron donatin" is meant that the moiety is more electron donating than hydrogen. Thus, highly preferably Y is a nitrogen or phosphorus containing group corresponding to the formula —N(R")— or —P(R")—, wherein R" is a C$_{1-10}$ hydrocarbyl.

Examples of suitable X* groups include:
s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; and
s-cis-$\eta^4$-1,4-bis(trimethylsilyl)-1,3-butadiene, said s-cis diene group forming a π-complex as defined herein with the metal Most highly preferred transition metal +2 compounds are amidosilane- or amidoalkanediyl- compounds of formula (V) wherein:
—Z*—Y— is —(ER'''$_2$)$_m$—N(R")—, and R' in each occurrence is independently selected from hydrogen, silyl, hydrocarbyl or combinations thereof, said R' having up to 10 carbon or silicon atoms, or two such R' groups on the substituted cyclopentadienyl group (when R' is not hydrogen) together form a divalent derivative thereof connected to adjacent positions of the cyclopentadienyl ring;

R" is C$_{1-10}$ hydrocarbyl;

R''' is independently in each occurrence hydrogen or a C$_{1-10}$ hydrocarbyl;

E is independently in each occurrence silicon or carbon; and m is 1 or 2.

Examples of the metal complexes according to the present invention include compounds wherein R" is methyl, ethyl, propyl, butyl, pentyl, hexyl, (including all isomers of the foregoing where applicable), cyclododecyl, norbornyl, benzyl, or phenyl; (ER'''$_2$)$_m$ is dimethylsilane, or ethanediyl; and the cyclic delocalized π-bonded group is cyclopentadienyl, tetramethylcyclopentadienyl, indenyl, tetrahydroindenyl, fluorenyl, tetrahydrofluorenyl or octahydrofluorenyl.

Specific highly preferred complexes include:
(t-butylamido)(tetramethyl-$\eta^5$-cyclopentadienyl)-1,2-ethanediyltitanium dimethyl,
(t-butylamido)(tetramethyl-$\eta^5$-cyclopentadienyl)-1,2-ethanediyltitanium dibenzyl,
(t-butylamido)(tetramethyl-$\eta^5$-cyclopentadienyl) dimethylsilanetitanium dimethyl,
(t-butylamido)(tetramethyl-$\eta^5$-cyclopentadienyl) dimethylsilanetitanium dibenzyl, (methylamido)(tetramethyl-$\eta^5$-cyclopentadienyl) dimethylsilanetitanium dimethyl, (methylamido)(tetramethyl-$\eta^5$-cyclopentadienyl) dimethylsilanetitanium dibenzyl, (phenylamido)(tetramethyl-$\eta^5$-cyclopentadienyl) dimethylsilanetitanium dimethyl-, (phenylamido)(tetramethyl-$\eta^5$-cyclopentadienyl) dimethylsilanetitanium dibenzyl-, (benzylamido)(tetramethyl-$\eta^5$-cyclopentadienyl) dimethylsilanetitanium dimethyl-, (benzylamido)(tetramethyl-$\eta^5$-cyclopentadienyl) dimethylsilanetitanium dibenzyl-, (t-butylamido)($\eta^5$-cyclopentadienyl)-1,2-ethanediyltitanium dimethyl, (t-butylamido)
($\eta^5$-cyclopentadienyl)-1,2-ethanediyltitanium dibenzyl, (t-butylamido)($\eta^5$-cyclo-pentadienyl) dimethylsilanetitanium dimethyl, (t-butylamido)($\eta^5$-cyclopentadienyl)dimethylsilanetitanium dibenzyl, (methylamido)($\eta^5$-cyclopentadienyl) dimethylsilanetitanium dimethyl, (t-butylamido) ($\eta^5$-cyclopentadienyl) dimethylsilanetitanium dibenzyl, (t-butylamido)($\eta^5$-indenyl)dimethylsilane-titanium dimethyl, (t-butylamido)($\eta^5$-indenyl)dimethylsilanetitanium dibenzyl, (benzylamido)($\eta^5$-indenyl)-dimethylsilanetitanium dibenzyl; and the corresponding zirconium or hafnium coordination complexes.

Specifically preferred catalysts, wherein M is titanium in the +2 or +3 formal oxidation state, are individualized in U.S. Pat. Nos. 5,470,993; 5,624,878; 5,556,928; 5,532,394; 5,494,874 and 5,374,696, all of which are herein incorporated by reference.

The cyclopentadienyl-containing transition metal compound catalyst is added in an amount suitable to yield the desired molar ratio of cocatalyst metal to Group 4 metal. For example, the ratio of cocatalyst aluminum (Al) to titanium (Ti)(for a titanium based cyclopentadienyl-containing transition metal compound catalyst) preferably is in the range of from about 10 to 1 up to about 10000 to 1. More preferably, the Al to Ti ratio is in the range of from about 50 to about 1000:1, most preferably from 50 to 500. Generally, it is desirable to achieve high cyclopentadienyl-containing transition metal compound catalyst activities for low Al/Ti ratios. Preferred is a catalyst activity above 100 kg of interpolymer per gram of catalyst transition metal per MPa unit of ethylene or propylene partial pressure per hour at an Al/Ti molar ratio of 300 or lower. Preferably, the catalyst loading per g of filler is less than about 10 micromoles ($\mu$mol), more preferably in range of from about 10 nmol/g to less than 1 $\mu$mol /g. The amount of cocatalyst immobilized per g of filler preferably is in the range of from about 50 nmol to about 5 mmol, more preferably in the range of from about 0.5 mmol to about 1 $\mu$mol/g of filler.

Preferably, all the components except for the filler (including the cocatalyst treated filler) are used in a liquid or dissolved form. Advantageously, a liquid medium is employed in which all reaction components except for the filler are sufficiently soluble in and which has a low toxicity. Suitable hydrocarbon media which can be employed to slurry the filler and to serve as a diluent or solvent for any other component are known in the art and include aliphatic hydrocarbons, cycloaliphatic hydrocarbons, aromatic hydrocarbons, naphthenic hydrocarbons, or combinations thereof. Preferred aliphatic hydrocarbons include butane, isobutane, pentane, isopentane, hexane, heptane, octane, isooctane, nonane, isononane, decane, and mixtures thereof. Suitable cycloaliphatic hydrocarbons are, for example, cyclopentane, cyclohexane, methylcyclohexane, cycloheptane and cyclooctane. Preferred aromatic hydrocarbons include benzene, toluene and xylenes. Preferred is the use of aliphatic solvents which are non-toxic and readily removable from the final polymerization product, for example, by devolatilization. Most preferred diluents or solvents are aliphatic hydrocarbons having 4 to 8 carbon atoms, such as isobutane, butane, isopentane, pentane and particularly heptane. Advantageously, catalyst treatment of the filler is carried out under an inert atmosphere to exclude air (oxygen) and moisture as much as possible. A suitable inert gas can be selected from nitrogen, argon, neon, or methane.

It is to be understood that the term "interpolymer(s)", as used herein, is meant to include copolymers and refers to any polymer derived from two or more chemically distinct monomers.

The interpolymer forming the matrix of the filled composite of the present invention preferably is an ethylene-based or a propylene-based interpolymer containing at least one additional monomer selected from $C_3$–$C_{20}$ alpha-olefins, $C_3$–$C_{20}$ polyenes, vinyl or vinylidene aromatic monomers and sterically hindered aliphatic or cycloaliphatic vinyl or vinylidene monomers for the ethylene-based interpolymers and selected from ethylene, $C_4$–$C_{20}$ alpha-olefins, $C_4$–$C_{20}$ polyenes, vinyl or vinylidene aromatic monomers and sterically hindered aliphatic or cycloaliphatic vinyl or vinylidene monomers for propylene-based interpolymers. The type of comonomer utilized in the present invention will depend on the properties desired for the filled composite. Advantageously, the interpolymer utilized in the invention is a homogeneous interpolymer in which the distribution of the monomers is random along the backbone of any given polymer molecule.

It is an advantage of the present invention that the active polymerization sites generated on the filler permit the efficient incorporation of longer chain monomers, particularly higher alpha-olefin comonomers having at least five carbon atoms, 1-octene being preferred, into polymers such that interpolymers of lower density and crystallinity may be obtained. The process of the present invention is more efficient at incorporating higher olefin monomers into the interpolymer than the processes for the preparation of a filled composite previously known. Additionally, it has been found that composites comprising an interpolymer of three monomers, for example, such as those composed of an ethylene/1-octene/1,9-decadiene interpolymer, can efficiently be prepared.

In a preferred embodiment, the filler carrying active polymerization sites is capable of efficiently promoting copolymerization of ethylene (as the principal monomer) with alpha-olefin comonomers from 3 to 20 carbon atoms, preferably from 3 to 18 carbon atoms, more preferably from 3 to 12 carbon atoms, and most preferably from 5 to 10 carbon atoms, thereby yielding a copolymer. Copolymers of propylene ($C_3$ alpha-olefin) with either ethylene, with either as principal monomer or on an equimolar basis, or copolymers with propylene as principal monomer and $C_5$–$C_{20}$, preferably $C_4$–$C18$, more preferably $C_4$–$C12$ and most preferably $C_5$–$C_{10}$, alpha-olefin comonomers are also preferred. Likewise preferred are substantially random interpolymers comprising polymer units derived from ethylene or propylene with one or more vinyl or vinylidene aromatic monomers and/or one or more sterically hindered aliphatic or cycloaliphatic vinyl or vinylidene monomers, and optionally with other polymerizable ethylenically unsaturated monomer(s). Such polymers are known from European Patent Application EP-A-0 416 815 and International Patent Application WO-A-98/01060. Most preferred for the purpose of the present invention are ethylene-based copolymers, particularly ethylene-hexene or ethylene-octene copolymers.

Alpha-olefins having from 4 to 20 carbon atoms ($C_4$–$C_{20}$) include, for example, isobutylene, 1-butene, 1-pentene, 1-hexene, 4-methyl-1-pentene, and, particularly preferred 1-octene. Other preferred monomers include styrene, halo- or alkyl-substituted styrene, tetrafluoroethylene, vinylbenzocyclobutane, 1,4-hexadiene, ethylidene, norbornene and naphthenics (for example, cyclopentene, cyclohexene and cyclooctene).

The polymerization-filled composites of the present invention are prepared by polymerizing ethylene or propylene with at least one comonomer on the filler material carrying on its surface active polymerization sites. The polymer substantially grows from and forms on the filler surface. The composites according to the invention are homogeneous in that the filler is uniformly dispersed in the polymer matrix, that is, the composite is substantially devoid of filler without polymer coating. The composites provided herein have an improved mechanical performance as compared to corresponding melt-blended composites. For example, the present filled composites are superior to the respective melt-blended counterparts with respect to tensile and impact properties, such as impact energy, elongation at break, and tensile strength. The composites provided by the present invention may be specifically designed to have elastomeric properties.

Homogeneity of the composites of the invention can be evaluated using generally known routine methods, such as electron micrography. The polymerization-filled composites of the invention comprise uniformly-dispersed filler in a range of from about 2 percent by weight to about 98 percent by weight (of composite), preferably in the range of from about 5 to about 90 percent, most preferably in the range of from 17 weight percent to 40 weight percent. Correspondingly, the interpolymer content is in the range of from 98 weight percent to 2 weight percent, preferably in the range of from 95 to 10 weight percent, most preferably in the range of from 83 weight percent to 60 weight percent.

Such composites can be processed and shaped into shaped articles by standard processing techniques including, for example, extrusion, injection molding, and calendering.

The composites of the invention may be characterized by various parameters including filler content of the composite, as well as parameters typically used to characterize interpolymer, such as comonomer content, crystallinity, molecular weight, melt indices, polydispersity or molecular weight distribution, or density. If desired, the interpolymer may be separated from the filler material for analysis, for example, by way of extraction.

Preferably, the comonomer content is from about 1 percent to about 60 percent by weight of the copolymer, more preferably in the range of from about 4 to about 50 percent by weight of the copolymer. Copolymer crystallinity and density are linked to the comonomer content.

Preferably, crystallinity is low, meaning in the range of from about 55 percent to about 20 percent. Crystallinity may be measured according to methods known in the art, for example, by running a DSC on a sample in the following way. Compression molded films are prepared from the samples to allow a better contact between DSC pan and the film. The samples are maintained at a temperature of 180° C. for 3 minutes, then cooled to −50° C. at the rate of 10° C./minutes and maintained at this temperature for 2 minutes. A second melting scan is carried out on these thermally treated samples from 50° C. to 140° C. at the rate of 10° C./minutes. The percent crystallinity is obtained by comparing the observed value to the latent heat of fusion of linear polyethylene (292 J/gm) or polypropylene (209 J/gm).

The density of the interpolymer desirably is in the range of from 0.87 g/cm$^3$ to 0.95 g/cm$^3$, preferably below 0.92 g/cm$^3$, most preferably below 0.91 g/cm$^3$.

Preferably, the interpolymers have a molecular weight distribution (MWD) in the range of about 1.5 to 6, preferably a MWD (Mw/Mn) in the range of about 2 to about 6, most preferably in the range of about 2 to less than about 5.

The mechanical properties of the composite can be selectively influenced, for example, by appropriate choice of the filler (for example, with respect to type, size and/or shape), interpolymer matrix and filler content.

The present invention relates to a process for the preparation of a filled composite under conditions allowing the interpolymerization of ethylene or propylene with at least one further monomer. Suitable conditions are, for example, such that allow production of at least 50 kilograms of interpolymer per gram of catalyst transition metal atom per MPa unit ethylene or propylene partial pressure. Interpolymerization and composite formation occur simultaneously. Preferably, polymerization is carried out in the presence of a molecular weight regulator, that is, an agent capable of controlling the molecular weight of the interpolymer, such as hydrogen. The polymerization step is performed at a temperature of from about −60° C. to about 120° C., preferably from 20° C. to 100° C., and most preferably from 40° C. to 95° C. Advantageously, pressure is from subatmospheric to about MPa, preferably to about 5 MPa. The process of the invention may be carried out using conventional polymerization equipment. The particular temperature and pressure for carrying out the polymerization step substantially depend on the particular polymerization process. For example, the polymerization may be carried out in a solution, or particularly, in a suspension or a slurry mode, or in the gas phase mode. Most preferably, the polymerization is carried out in the slurry mode.

The composite of the invention may be produced via a continuous or a batch-controlled polymerization process using at least one reactor, but can also be produced using multiple reactors (for example, using a multiple reactor configuration as described in U.S. Pat. No. 3,914,342) at a polymerization temperature and pressure sufficient to produce the interpolymers having the desired properties.

If desired, the polymerization reaction may be terminated, for example, after a certain filler level has been attained. In a batch reactor, termination of polymerization may be achieved, for example, by adding catalyst deactivator, such as methanol or water, or by transferring the reactor contents into another vessel containing the deactivator. In a continuous process, the catalyst deactivator may be injected at the outlet of the reactor, and the monomers be recycled to the reactor.

It has been found that in the process of the resent invention the molecular weight of the interpolymer can be controlled by using a molecular weight control agent, such as hydrogen. The presence of such agent during polymerization leads to polymers having decreased molecular weight as compared to the absence of such agents. Control of the molecular weight is important because of its effect on the mechanical properties and the processability of the filled composite. Preferably, the polymerization is carried out in the presence of hydrogen as a molecular weight control agent. Hydrogen is used in an amount as to give a hydrogen-to-olefin partial pressure ratio of from about 1 to 20 to about 20 to 1, and more preferably of from about 1 to 15 to about 1 to 1.

In the following Examples, Satintone™ W/Whitex is used as the filler. Satintone™ W/W are calcinated aluminium silicates having flake shaped particles, a surface area of 12 m$^2$/g, a density of 2630 kg/m$^3$ and a pH of 6, with an average size of 1.4 microns or $\mu$m. The filler is used after drying overnight at 100° C. and 1.333 Pa pressure.

The transition metal compound used is (tert-butylamido) dimethyl (tetramethyl-$\eta^5$-cyclopentadienyl)silanetitanium dimethyl, referred to hereinbelow as "catalyst", is dissolved in heptane at concentrations of 6.054×10$^{-3}$ M, 5.31×10$^{-3}$ M or 5.99×10$^{-3}$ M, depending on the example.

Modified methylaluminoxane, Type 3A, (MMAO) and the trimethylaluminum (TMA) are purchased from AKZO Chemical and correspond to solutions of 6.7 weight percent and 15 weight percent of Al in heptane, respectively. One third of the methyl groups of MMAO are replaced by isobutyl groups which increases its solubility in aliphatic hydrocarbon solvents. The methylaluminoxane (MAO) is used as 10 weight percent of Al in toluene. MAO generally contains a significant quantity of TMA, typically about 30 to 35 mole percent which should be determined. The total quantity of Al determined by calorimetric titration is equal to 1.507 M in Al. The total quantity of reactive methyl groups is determined by volumetric titration giving a concentration of 2.526 M in reactive methyl groups. Assuming that only two species exist in the medium, MAO with one reactive methyl group per aluminum and TMA with three reactive methyl groups per aluminum, the relative amount of the two species can be easily calculated to give a solution containing 34 mol percent of TMA. Other MAO solutions are used with a total Al content of 1.66 M in Al (30 mol percent TMA) and 1.60 M in Al (34 mol percent TMA).

The quantity of MMAO that reacts with the surface of the filler can be determined by volumetric measurement of the methane by-product, evolving during the reaction according to the following procedure: in a flask equipped with a rubber septum connected to a gas burette through an oil valve, previously flamed and purged with nitrogen, 20 g of Satintone W/W, dried at 100° C. under reduced pressure (1.333 Pa) overnight, is dispersed in 250 mL of dry and oxygen-free heptane and kept at −78° C. After addition of 27.4 mL of MMAO (2.57 M), the reaction mixture is heated to 60° C. and kept at that temperature until no further gas evolution is observed. The volume measured corresponds to 0.33 mmol of methane/g filler.

The washing step under inert atmosphere involves removal of heptane using a glass frit and addition of 100 mL of hot toluene (60° C.). After shaking and stirring, the toluene is removed by filtration and replaced by a new portion of toluene. This last operation is repeated and finally, 250 mL of n-heptane are added to the filler.

The n-heptane used in the experiments is dried by refluxing over sodium and transferred onto conditioned molecular sieves (3 Å and 4 Å). The moisture content is evaluated by Karl-Fisher technique and reveals 1.5 ppm $H_2O$. Oxygen is removed by nitrogen bubbling. The toluene is dried by refluxing over $CaH_2$ for several days. The 1-octene comonomer is dried overnight in the dark on a Na/K alloy (50/50 weight percent) and freshly distilled before use.

The preparation of the reactor involves two hours of heating under vacuum at 110° C. followed by several nitrogen purges and setting the temperature to 70° C.

The filler content of the olefin polymer composites is determined by calcining a weighed amount of composite in an electrical oven at 500° C. for 5 hours, and calculating the filler content from the amount of ash left after calcination.

The melting temperature of the polymer can be determined in the composite without separating it from the filler by measuring the endotherms of 10 mg composite sample using a Du Pont DTA 2000 calorimeter. The melting temperature is determined by heating the sample up to 200° C. at 20° C./minute, cooling the sample to −100° C. using liquid nitrogen quenching, and heating it up again to 200° C. at the same heating rate. The endotherms are recorded during the second heating cycle. Melting temperature is determined from the temperature at the peak of the melting endotherm.

Melt index values are measured according to ASTM 1238 at 190° C. using a CEAST 6543 apparatus. Three different loads are used: 2.16 kg ($MI_2$), 10.00 kg ($MI_{10}$) and 21.60 kg ($MI_{21}$).

Impact characteristics are determined according to ASTM D 256B using U-notch specimens on a Charpy CEAST 6546 apparatus. The length, width, and thickness of the specimens are 50 mm, 6 mm, and 2 mm, respectively. The notch depth is 0.35 mm. The testing is carried out at room temperature and repeated for 5 samples and the average value calculated. The energy of the hammer is 4 J.

Tensile properties are determined on an Instron DY.24 apparatus, according to the ASTM D 253 using dumbbell-shaped samples. Tensile rate is 20 mm per minute and the length, width, and thickness of the dumbbell samples are 19 mm, 5 mm and 2 mm, respectively. The testing is carried out at room temperature and an average value for 5 samples is recorded.

The test specimens are cut out of plates of polymer composite prepared as follows. Powdery composite, as obtained from the polymerization after drying is melted at 190° C. in a two-roll mill and compression molded at 200° C. for 3 minutes into 2 mm thick plates prior to quenching with circulating cold water.

The branching level of the interpolymer composite is determined by $C^{13}$NMR spectrometry, and carried out with a Bruker 400 apparatus at 110° C. The composite samples were dissolved in perdeuterobenzene-1,2,4-trichlorobenzene at a 1:5 volume ratio mixture. Using a special sequence DEPT, the spectra are obtained after approximately 20,000 pulses. Deuterobenzene is used as an internal lock.

Molecular weight and molecular weight distribution of composite matrix are determined by using size exclusion chromatography operating at 140° C. using trichlorobenzene as a solvent, and calibrated with polystyrene standards.

The following Examples are given to illustrate the invention, and should not be construed as limiting its scope.

All percentages are expressed as weight percentages, unless indicated otherwise. The catalyst efficiency (C.E.) is expressed in Kg olefin polymer per gram transition metal per hour, abbreviated as Kg PE/(gTm.h). The impact energy (I.E.) is expressed in $KJ/m^2$, the elongation at break ($\epsilon_b$) is given in percent, the tensile strength at break ($\sigma_b$) in MPa, melt indices are expressed in g/10 minutes. The octene incorporation is expressed in mol percent of total copolymer.

EXAMPLE 1

To 20 g of Satintone W/W dried overnight under vacuum at 100° C., are added successively, 250 mL n-heptane, 1.5 mL TEA (1.2 M), 6.5 mL MMAO (2.55 M) and 9.3 mL of catalyst (6.05 $10^{-3}$ M). At 60° C., the TEA is added to the filler slurry prior to MMAO. After complete evolution of gas, the catalyst is added and reacted for one hour at 60° C., followed by one night at room temperature. The catalyst slurry is then transferred under $N_2$ to the reactor containing 1.2 L of heptane and 30 mL of purified 1-octene at 70° C. The reactor has previously been dried by washing at 70° C. with 1 L of heptane containing 6 mL MMAO (2.57 M) for one hour prior to complete removal of the washing solution. The polymerization is carried out under 0.3 MPa $H_2$, 2 MPa of $C_2H_4$ for 11 minutes, yielding 55 g of copolymer. The catalyst activity is 111 KgPE/(gTi.h). The composite thus produced is characterized by a filler content of 26.7 percent and an $MI_2$ of 0.2; the amount of octene incorporated is 2.5 mol percent. The composite shows an elongation at break of 262 percent combined with an impact energy of 54 $kJ/m^2$. Modulus E is 0.8 GPa, and tensile strength at break is 20 MPa.

EXAMPLE 2

20 g of Satintone W/Whitex are dried overnight at 100° C. under reduced pressure (1.333 Pa). 250 mL of dry n-heptane are added under nitrogen. The stirred slurry is heated at 60° C. and 1.38×$10^{-2}$ moles of MAO (9.2 mL, 1.507 M in Al) are added under nitrogen and allowed to react for 1 hour. 4.55×$10^{-5}$ moles of catalyst (8.6 mL, 5.31 $10^{-3}$ M) are added to the mineral slurry to obtain an Al/Ti ratio of 300. The catalyst slurry is transferred to the reactor containing 1.2

L of pure n-heptane and 30 mL (0.191 mol) of 1-octene. The polymerization is carried out at 70° C. under 0.3 MPa of hydrogen at start and 1.7 MPa of ethylene. No significant rise in temperature is observed. A homogeneous-filled composite with a filler content of 17.5 percent and an octene content of 4.4 mole percent is produced, with the C.E. being 104 kg polymer/gTi.h. The sample is brittle, which is expected from the very low molecular weight obtained (Mw=15500, Mn=4600), or the high melt index (MI$_2$>1000 g/10 minutes).

EXAMPLE 3

20 g of Satintone dried for 1 night at 100° C. under reduced pressure (1.333 Pa) are treated for 16 hours with 3.32×10$^{-2}$ moles of MAO (20 mL, 1.66 M in Al) in 250 mL of dry n-heptane at room temperature. Then, the solvent is evaporated under reduced pressure at room temperature and the resulting solid is heated at 150° C. under reduced pressure for two hours. During evaporation, TMA is distilled off. The TMA-containing heptane solution is hydrolyzed with HCl and titrated by colorimetry. The amount of TMA is determined to be 7.27×10$^{-3}$ moles. The treated filler is washed with 100 mL of hot toluene, filtrated and suspended in 250 mL of dry n-heptane. The toluene wash is hydrolyzed and titrated to give 4.81×10$^{-3}$ moles of non-immobilized MAO. Thus, the amount of MAO immobilized on the filler is calculated to be 2.11×10$^{-2}$ moles on 20 g of kaolin or 1.055×10$^{-3}$ moles/g of kaolin. 4.93×10$^{-5}$ moles of catalyst (9.3 mL, 5.31×10$^{-3}$ M) are added at 80° C. (Al/Ti ratio=428) and allowed to react at this temperature for 1 hour. The stirred slurry is then transferred into the reactor already charged with 1100 mL of dry n-heptane and 50 mL of octene (0.318 moles). Polymerization is carried out at 70° C. under an ethylene pressure of 1.85 MPa and a starting hydrogen pressure of 0.15 MPa. An exotherm of 10° C. is observed during the reaction. This method is efficient in immobilizing high amounts of MAO. The rubbery composite obtained is unfiltrable, but appeared to be homogeneous in filler distribution. It is dried under reduced pressure yielding a material with elastomeric-like properties. The catalyst activity observed for this polymerization is 133 kg PE/g Ti.h. The composite contains 19.1 percent of kaolin and has 2 melting exotherms in DSC at 84° C. and 122° C. (second run). It has comparatively low melt index values (MI$_2$=0.05; MI$_{21}$=2.42), but interesting mechanical properties with elastomeric-like stress-strain curves (tensile strength of 12.8 MPa and elongation at break of 662 percent). The mean value of the octene content of the composite is 12 mole percent.

EXAMPLE 4

For Examples 4 and 5, the filler is treated as follows: 20 mL of methylaluminoxane 1.6 M in Al in toluene solution are evaporated under reduced pressure in order to remove trimethylaluminum (TMA). The white glassy material obtained is then solubilized in 20 mL of freshly distilled toluene and immediately transferred under N$_2$ into a two-neck round bottom flask equipped with a magnetic stirrer and containing a suspension of 20 g of Satintone W/Whitex (dried for one night at 100° C. under a reduced pressure of 1.333 Pa) in 250 mL of dry n-heptane. The mixture is allowed to react under vigorous stirring at room temperature for 1 hour. The solvent is evaporated under reduced pressure. The white solid obtained is then treated at 150° C. for two hours under reduced pressure. It is then washed twice with 100 mL of dry toluene at 80° C. After filtration of the second toluene washing, 250 mL of dry n-heptane are added followed by 5.99×10$^{-5}$ moles of catalyst (10 mL, 5.99×10$^{-3}$ M) in Example 4, and 4.79×10$^{-5}$ moles in Example 5 (8 mL, 5.99×10$^{-3}$ M). The mixture is allowed to react for 1 hour at 80° C. before being transferred into the reactor. The Al/Ti ratio is calculated from the amount of evacuated TMA and excess MAO in the wash.

The treated filler is transferred to the reactor containing 1150 mL of dry n-heptane and 50 mL (0.318 mole) of distilled 1-octene. Polymerization is carried out under an ethylene pressure of 0.9 MPa. An exotherm of 18° C. is observed during the polymerization. The calculated Al/Ti ratio is 320. The activity of the polymerization is found to be higher than what is generally observed under similar conditions with non-treated MAO (C.E.=102.3 kg PE/(gTi.h)). The composite has an elongation at break ($\epsilon_b$) of 355.7 and a tensile strength of 11.8 MPa, which is high for a 32 percent filled composite. The absence of hydrogen lead to high molecular masses (Mw=239000, Mn=67800, MI$_{10}$=0.03). Octene does not, in this case, act as an efficient molecular weight control agent. The octene content is determined to be 3.9 mole percent.

EXAMPLE 5

The filler is treated as described in Example 4 above. The reactor, filled with the treated filler, 1400 mL of dry heptane, 50 mL of 1-octene and 1 mL of 1,9-decadiene is saturated with 0.12 MPa of hydrogen for 3 minutes. The polymerization is carried out under 0.9 MPa of ethylene for 13.6 minutes at a constant temperature of 70° C. The composite obtained appears to be unfiltrable because of its elastomeric nature, therefore the solvent is allowed to evaporate before the drying stage. The Al/Ti ratio is calculated to be 230. The resulting composite containing 19 percent of filler combined high tensile strength (24.8 MPa) and high elongation at break (994.8 percent) with acceptable processability (MI$_2$=0.03, MI$_{10}$=0.51) for the filler level. Moreover, the catalyst exhibited an activity of 163.3 Kg PE/(gTi.h), which is relatively high for the low Al/Ti ratio.

EXAMPLE 6

16 mL of MAO (1.6 M in Al) in a toluene solution are evaporated under reduced pressure in order to distill off free TMA. The white powder is then solubilized in 16 mL of freshly distilled toluene and immediately transferred under nitrogen in a two-neck, round bottom flask equipped with a magnetic stirrer containing a suspension of 16 g of Satintone (dried for 1 night at 100° C. under a reduced pressure of 1.333 Pa) in 200 mL of dry n-heptane. The mixture is allowed to react for 1 hour at room temperature. The solvent is then evacuated under reduced pressure. The white solid obtained is treated at 150° C. for two hours and then washed twice with 80 mL of dry toluene at 80° C. The washed filler is suspended in 200 mL of dry n-heptane and 3.83×10$^{-5}$ moles of catalyst (6.4 mL; 5.99×10$^{-3}$ M) are allowed to react with the filler for 1 hour at 80° C. The treated filler is then transferred to the reactor containing 920 mL of dry n-heptane, 40 mL of distilled 1-octene and 0.8 mL of 1,9-decadiene. The reactor is saturated with 0.12 MPa of hydrogen for 3 minutes. The polymerization is carried out at 70° C. under 0.9 MPa of ethylene. An exotherm of 6° C. is observed during the polymerization. The reaction is stopped after 6.9 minutes. The Al/Ti ratio is calculated to be 274. The observed exotherm seems to increase the fluidity of the molten composite to give a high melt flow index (only MI$_2$ can be measured). However, this composite containing 40 percent filler has a relatively high elongation at break (229.6 percent and the tensile strength (13.2 MPa) is lower compared to the composite of Example 5.

What is claimed is:

1. A process for the preparation of a filled polymer composite comprising 1 to 98 percent by weight of an interpolymer and 2 to 99 percent by weight of a filler, said process comprising polymerizing ethylene or propylene and at least one comonomer in the presence of a cyclopentadienyl-containing transition metal catalyst and a filler having immobilized thereon an aluminoxane, or a mixture of aluminoxanes, the immobilization of the aluminoxane, which takes place prior to copolymerization, comprising subjecting the cocatalyst treated filler to a heat treatment at a temperature in the range of from 50° C. to 250° C., in which filler the aluminum present in the aluminoxane is not more than 10 percent by weight extractable in a one-hour extraction with toluene at a temperature of 90° C., using 10 mL toluene per gram of treated filler, under conditions to allow copolymerization of ethylene or propylene and at least one comonomer to form said composite.

2. A process according to claim 1, which is performed in the presence of a molecular weight control agent.

3. A process according to claim 1 wherein the filler is an inorganic filler having hydroxyl functionality.

4. A process according to claim 1 wherein the filler is an aluminum silicate clay.

5. A process according to claim 1 wherein the cyclopentadienyl-containing transition metal catalyst is a compound of Formula (IV)

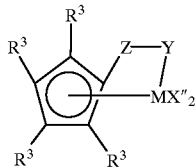

(IV)

wherein:

M is titanium in the +2, +3, or +4 formal oxidation state;

$R^3$ in each occurrence independently is selected from hydrogen, hydrocarbyl, silyl, germyl, cyano, halo, hydrocarbyloxy, dihydrocarbylamino, or combinations thereof, said $R^3$ having up to 20 non-hydrogen atoms, or adjacent $R^3$ groups together form a divalent derivative selected from a hydrocarbadiyl, siladiyl or germadiyl group thereby forming a fused ring system;

each X" in Formula (IV) is a hydride, halide, hydrocarbyl, hydrocarbyloxy or silyl group, said group having up to 20 non-hydrogen atoms, or two X" groups together form a neutral $C_{5-30}$ conjugated diene or a divalent derivative thereof;

Y is —O—, —S—, —NR*—, —PR*—, —NR*$_2$ or —PR*$_2$; and

Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is independently at each occurrence hydrogen, silyl, hydrocarbyl, or hydrocarbyloxy, or combinations thereof, said R* having up to 30 carbon or silicon atoms.

6. A process according to claim 1, wherein ethylene is polymerized with at least one comonomer selected from the group consisting of a $C_3$–$C_{20}$ alpha-olefin and a $C_3$–$C_{20}$ polyene.

7. A process according to claim 1, wherein propylene is polymerized with at least one comonomer selected from the group consisting of ethylene, a $C_4$–$C_{20}$ alpha-olefin and a $C_4$–$C_{20}$ polyene.

8. A process according to claim 6 wherein the comonomer is octene.

9. A process according to claim 1 wherein the filler has a surface area of from about 0.1 m²/g to less than about 100 m²/g.

10. A polymerization-filled composite obtained according to the process of claim 1.

11. A shaped article made from the composite according to claim 10.

* * * * *